United States Patent [19]

Sims, Jr.

[11] Patent Number: 5,253,467
[45] Date of Patent: Oct. 19, 1993

[54] COMPOSTING APPARATUS

[76] Inventor: Fletcher Sims, Jr., Rte. 1, Box 202, Canyon, Tex. 79015

[21] Appl. No.: 839,399

[22] Filed: Feb. 20, 1992

[51] Int. Cl.$^5$ .................... A01D 43/02; A01D 43/04
[52] U.S. Cl. ...................................... 56/372; 56/365; 56/DIG. 2; 56/DIG. 21
[58] Field of Search ............... 56/370, 372, 365, 16.4, 56/DIG. 2, DIG. 5, DIG. 20, DIG. 21

[56] References Cited

U.S. PATENT DOCUMENTS

| 106,441 | 8/1870 | Wilson . |
| D. 220,096 | 3/1971 | Cobey . |
| 534,403 | 2/1895 | Mechwart . |
| 587,444 | 8/1897 | Kraft . |
| 1,331,200 | 2/1920 | Hoefen . |
| 1,396,037 | 11/1921 | Garst . |
| 2,159,509 | 5/1939 | Mosel . |
| 2,159,987 | 8/1939 | Mosel . |
| 2,228,389 | 1/1941 | Garey . |
| 2,753,782 | 7/1956 | Chattin . |
| 3,202,221 | 8/1965 | Monk et al. . |
| 3,369,797 | 2/1968 | Cobey . |
| 3,372,657 | 3/1968 | Hansen . |
| 3,662,962 | 5/1972 | Cobey . |
| 3,733,033 | 5/1973 | Cobey . |
| 3,776,528 | 12/1973 | Toto . |
| 3,831,536 | 8/1974 | Orthman . |
| 3,856,276 | 12/1974 | Pannell . |
| 3,862,539 | 1/1975 | Stevens . |
| 3,881,707 | 5/1975 | Toto . |
| 3,892,278 | 7/1975 | Smith et al. . |
| 3,937,261 | 2/1976 | Blum . |
| 3,982,772 | 9/1976 | Scherer ................ 56/370 X |
| 3,995,570 | 12/1976 | van der Lely . |
| 4,019,723 | 4/1977 | Urbanczyk . |
| 4,067,504 | 1/1978 | Teates . |
| 4,199,030 | 4/1980 | Chance . |
| 4,290,703 | 9/1981 | Roman . |
| 4,302,236 | 11/1981 | Roman . |
| 4,306,686 | 12/1981 | Urbanczyk . |
| 4,360,065 | 11/1982 | Jenison et al. . |
| 4,396,292 | 8/1983 | Roman . |
| 4,397,674 | 8/1983 | Laughbaum . |
| 4,410,142 | 10/1983 | Carlson . |
| 4,457,630 | 7/1984 | Pannell . |
| 4,468,128 | 8/1984 | Cobey . |
| 4,478,520 | 10/1984 | Cobey . |
| 4,658,910 | 4/1987 | Garriss . |
| 4,739,610 | 4/1988 | Schultz . |
| 4,940,338 | 7/1990 | Backhus . |
| 5,001,894 | 3/1991 | Slater . |

Primary Examiner—George A. Suchfield
Attorney, Agent, or Firm—Crutsinger & Booth

[57] ABSTRACT

The blades on the drum in composting apparatus are arranged obliquely relative to the direction of the helical spiral and also obliquely to the axis of the drum and to the direction of travel of the chassis of the vehicle for moving material toward the center of the drum. Blades adjacent the center of the drum attack the face of a pile of compost material first and create a void, which is then filled by material moved by the following blade, while it is creating another void to be filled by material moved by the next blade and so on to the end of the spiral and the outer ends of the drum.

20 Claims, 4 Drawing Sheets

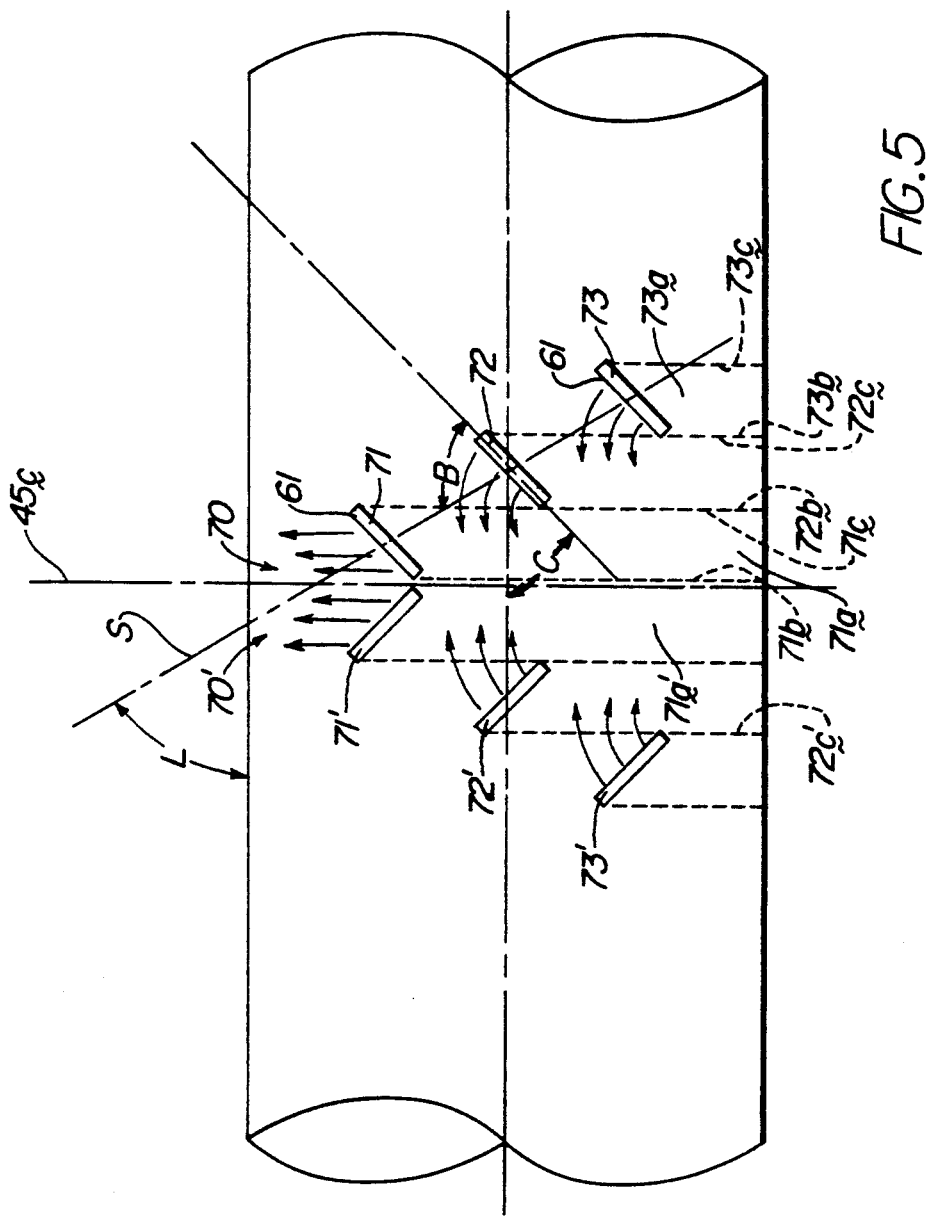

COMPOSTING APPARATUS

TECHNICAL FIELD

This invention relates to a windrow straddling vehicular mounted composting apparatus having a rotating drum with blades arranged in a spiral pattern and having faces pitched to throw material toward the center of the drum.

BACKGROUND OF THE INVENTION

The composting apparatus disclosed herein relates to improvements in apparatus of the type disclosed in Cobey U.S. Pat. No. 3,369,797; Urbanczyk U.S. Pat. No. 4,019,723; Chance U.S. Pat. No. 4,199,030; Jenison U.S. Pat. No. 4,360,065 and Slater U.S. Pat. No. 5,001,894.

Compost turning and windrow forming machines generally incorporate a rotating drum having radially projecting teeth with flat or slightly curved throwing surfaces for turning organic matter deposited in piles. Turning the organic matter increases the rate of oxidation and bacterial action which is generally required during the transformation of yard waste, manure from poultry and cattle feed lots, sludge from sewage treatment plants, rubbish and other organic waste material during the composting process.

Cobey U.S. Pat. No. 3,369,797 discloses a mobile apparatus for straddling ground-deposited material which is provided with a power-driven rotatable drum having a plurality of radially projecting narrow teeth which engage and fragment the material. The teeth are disclosed as being positioned in a helical or spiral pattern in converging relationship from each end of the drum toward its midpoint where congestion occurs. Throwing surfaces on the teeth are parallel to the direction of the spiral pattern and angularly inclined to the direction of travel of the periphery of the drum and in a converging relationship towards the midpoint of the drum. The configuration of the underside of the frame above the drum provides a funnel effect for the discharge of the material that is thrown in an upward and rearward direction.

The teeth are spaced apart a distance which is several times the width of each tooth, leaving wide spaces between the teeth. The auger effect of the spaced teeth having faces parallel to the spiral pattern is augmented by a pair of broad-surfaced blades mounted near the center of the drum.

Chance U.S. Pat. No. 4,199,030 discloses a rotatable plowing tool, for farming row crops, having a cylindrical rim and an array of soil digging teeth secured to the rim and projecting radially, each tooth of the array being rigidly secured to the rim with its radial axis disposed perpendicular to the axis of rotation of the rim and being characterized by first and second planar faces at least one of which is obliquely inclined with respect to the radial axis of the tooth and sloping away from the direction of rotation of the rim. The rim and drive wheels of the towing vehicle rotate in the same direction such that cultivated soil moves under the rim. The planar faces of each tooth converge at the distal end of the tooth to define a sharp cutting edge. Each tooth of the array on each rim is oriented in such a manner that the plane containing the cutting edge and the radial axis of the tooth defines an oblique cutting angle with respect to the plane containing the radial axis of the tooth and the line of travel of the carriage assembly. The soil engaged by the blades is moved laterally with respect to the line of travel to form elevated seed bed rows.

Jenison U.S. Pat. No. 4,360,065 discloses a cultivator adapted to straddle a windrow of material such as compost, equipped with a horizontal drum having a plurality of cultivator blades disposed in two helical arrays between opposite ends of the drum. Faces on the blades are parallel to the direction of travel of the machine and perpendicular to the longitudinal axis of the drum. The arrays are described as being circumferentially spaced 180° apart about the drum and extending equal distances on opposite sides of the central, longitudinal, vertical plane along the center of the frame of the cultivator. The blades on the right and left sides of the drum have paddle portions at their ends transversely offset toward the central vertical plane and contoured to move material sideways and heap it up into a peak along the center of the windrow. The helical arrays of blades are identical and symmetrical on opposite sides of the windrow center, enabling repeated passes of the cultivator to circulate material between the inside and the outside of the windrow while maintaining it with a triangular cross section. Two specific blade shapes are disclosed, one primarily for windrow cultivation and aeration, and another for shredding paper, cardboard, magazines and the like prior to composting.

Slater U.S. Pat. No. 5,001,894 discloses a bearing guard for a compost turner adapted for guarding the bearing of a rotating mandrel from entanglement with polymeric bags used to haul leaves, grass clippings and the like to a landfill site. A cylindrical mandrel has a multiplicity of narrow turning tines extending generally perpendicularly from its cylindrical surface and the tines are arranged in two spiraling rows around the perimeter of the surface. The tines, having faces parallel to the direction of travel of the machine and perpendicular to the longitudinal axis of the drum, are oriented to urge compost toward the longitudinal central plane of the mandrel.

The configuration of teeth on rotating drums of composting apparatus heretofore devised were arranged in a helical spiral arrangement in an effort to form an auger configuration for moving material laterally. Some configurations require successive passes to complete the circulation of the material. However, a need exists for composting apparatus which more effectively mixes, turns and aerates material for speeding the decomposition of organic material in a manner that consumes less energy.

SUMMARY OF INVENTION

The composting apparatus disclosed herein employs a drum having closely spaced generally radially extending blades, the drum being rotatable such that each blade lifts material in its path upwardly while translating the material over the drum for moving the material toward the center of the longitudinal axis of the drum. The inner edge of each blade is circumferentially aligned with the outer edge of the next blade. The blades are arranged in helical spiral patterns proceeding from the midpoint of the drum toward either end, on opposite sides of the center of the drum. The blades are offset in each helical spiral array such that blades on one side of the drum covers the area between blades on the diametrically opposite side of the drum.

A first blade moves vertically along a first path through the center of a pile of compost to form a first swath; a second blade moves vertically along a second path adjacent the first path to form a second swath while moving material transversely of the first and second paths such that material moved by the second blade to form the second swath is deposited in the vertically extending void in the first swath. A third blade moves vertically along a third path adjacent the second path to form a third swath while moving material transversely of the second and third paths such that material moved by the third blade to form the third swath is deposited in the vertically extending void in the second swath to aerate material and mix dry and wet material uniformly throughout the compost pile.

The first, second and third blades are arranged in a first array and first and second blades in a second array move vertically such that the first blade of the second array moves along a path overlapping adjacent portions of the first and second paths through material which has been moved into the first and second paths by the second and third blades of the first array such that the first blade of the second array forms a generally vertically extending swath into which compost material is moved by the second blade in the second array.

The obliquely placed planar surfaces on the spaced blades are arranged such that outer ends of the blades slice the vertical extending surface of the pile and brush the underlying planar surface on which the compost pile rests and being offset on opposite sides of the drum, make a clean sweep of the underlying surface, thus insuring an aeration of all the material from the bottom of the pile to the top in only one pass.

The blades on the drum are arranged obliquely to the direction of the helical spiral and also obliquely to the axis of the drum and to the direction of travel of the chassis of the vehicle for moving material toward the center of the drum. Blades adjacent the center of the drum attack the face of the pile of material first and create a void, which is then filled by material moved by the following blade, while it is creating another void to be filled by material moved by the next blade and so on to the end of the spiral and the outer ends of the drum.

The placement and shape of the blades permit shaping of the pile of material without requiring the use of baffles, funnel shaped skirts and other shaping devices. The novel arrangement and placement of blades on the drum consumes less energy in the turning process than with devices heretofore developed because material is folded into the void formed by the swath of the preceding adjacent blade, thereby reducing the drag on the drum.

Further, the shape, configuration and placement of blades on the drum effects a more thorough mixing of all materials through the cross section of the pile, which results in better aeration and thus speeds the decomposition of organic material.

An objective in this invention is to increase the speed of the decomposition process by increasing the aeration and providing a more thorough mixing of the material. Another objective of this invention is to improve the energy efficiency of the process.

Yet another objective of this invention is to provide a more homogenous mixture in the cultivated windrow. A uniform mixture is especially important in arid or wet climates. In an arid or semi-arid climate the outer edges of the windrow become dry and the material in the middle of the windrow retains a greater moisture content. In a wet climate the outer edges of the windrow may have a greater moisture content than the material located in the middle of the windrow. In both cases providing a homogenous mixture in the cultivated windrow will increase the efficiency and speed of the decomposition process.

DESCRIPTION OF DRAWINGS

Drawings of a preferred embodiment of the invention are annexed hereto so that the invention may be better and more fully understood, in which:

FIG. 5 is an enlarged diagrammatic view of a portion of the drum illustrating the orientation of the blade assemblies.

Numeral references are employed to designate like parts throughout the various figures of the drawing.

DESCRIPTION OF A PREFERRED EMBODIMENT

Figure 1:
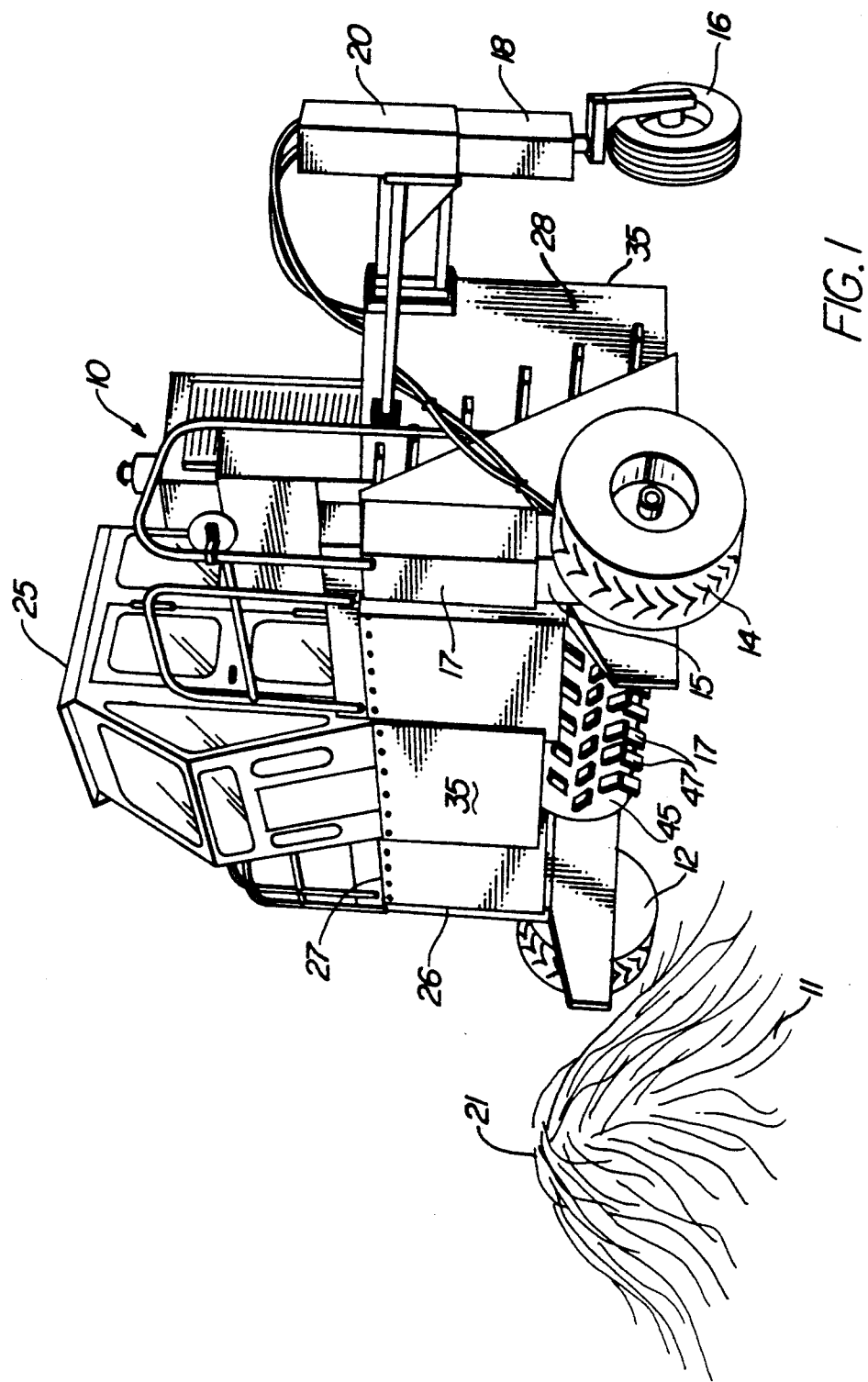
FIG. 1 is a diagrammatic perspective view of composting apparatus.

Referring to FIG. 1, the numeral 10 generally designates composting apparatus comprising a vehicle frame having a pair of drive wheels 12 and 14, each of which preferably is independently controlled by hydraulic motors (not shown) such that drive wheels 12 and 14 are independently controllable. Wheels 12 and 14 are preferably mounted on vertically adjustable posts 15 that are movable by hydraulic cylinders (not shown) through columns 17 to elevate the machine. For maneuvering the vehicle, one of the drive wheels may be stopped while the other is driven or drive wheels 12 and 14 may be driven in opposite directions or driven in the same direction at different speeds. A pair of guide wheels 16, one of which is illustrated in FIG. 1, are mounted on the rear end of the frame. Wheels 16 are preferably casters rotatable about a vertical axis extending through a post 18, which is movable vertically through a tubular column 20 by a hydraulic cylinder (not shown) mounted inside column 20.

A conventional cab 25 is mounted on the frame forming an enclosure for the operator and control valves in a hydraulic system for controlling various components of the vehicle. The frame of composting apparatus 10 is of conventional design, except for specific features which will be hereinafter more fully explained. The frame and hydraulic control apparatus may be similar to that disclosed in Urbanczyk U.S. Pat. No. 4,019,723, the disclosure of which is incorporated herein by reference in its entirety for all purposes.

A pair of side skirts 26 and 28 extend downwardly from a generally horizontally extending floor 27. Skirts 26 and 28, extending vertically along each side of the vehicle, are configured to form a tunnel 35 bounded on opposite sides by skirts 26 and 28, floor 27 forming a roof spanning across the width of the tunnel 35. A hydraulically driven drum 45 is rotatably supported in the tunnel 35 and has opposite ends rotatably supported in bearings supported by skirts 26 and 28. The drum 45 is driven by a hydraulic motor (not shown) connected through a drive train (not shown) drivingly connected to the drum 45.

Lower surfaces on side skirts 26 and 28 move closely adjacent and along the underlying surface 11 and blunt outer ends 62x of blades 60 preferably extend about ⅛" below lower surfaces of the side skirts. The elevations of lower surfaces of side skirts 26 and 28 and ends 62x of blades 60 are vertically adjustable by cylinders mounting wheels 12, 14 and 16. Blunt ends 62x of blades 60 are preferably parallel to the axis 45a of drum 45 to brush the underlying surface 11 without digging into the surface.

During normal operation, drive wheels 12 and 14 rotate in a counter-clockwise direction as viewed in FIG. 1 of the drawing thereby propelling the vehicle to the left as viewed in FIG. 1. The vehicle is preferably maneuvered such that it straddles a compost pile 21, drive wheel 12 being on one side of the pile 21 while drive wheel 14 is positioned on the opposite side. As the vehicle moves to the left as viewed in FIG. 1, material in the compost pile 21 moves through tunnel 35 and is engaged by blades 60 on drum 45, as will be hereinafter more fully explained.

Drum 45 preferably rotates in a clockwise direction, as viewed in FIG. 1, such that blades 60 on the side of drum 45 toward the front of the vehicle move upwardly such that material in the compost pile 21 is lifted and folded into the adjacent void created by the preceding blade, such that the material in the center is moved over the top of the drum and deposited on the ground behind the drum 45. Thus, drive wheels 12 and 14 are normally driven to rotate in a counterclockwise direction while drum 45 is rotated in a clockwise direction such that powered drive wheels 12 and 14 move the vehicle along the compost pile 21 while drum 45 turns and aerates material in the compost pile 21 while depositing the aerated material in a pile which moves out of the exit end of tunnel 35 at the rear of the vehicle.

Figure 4:
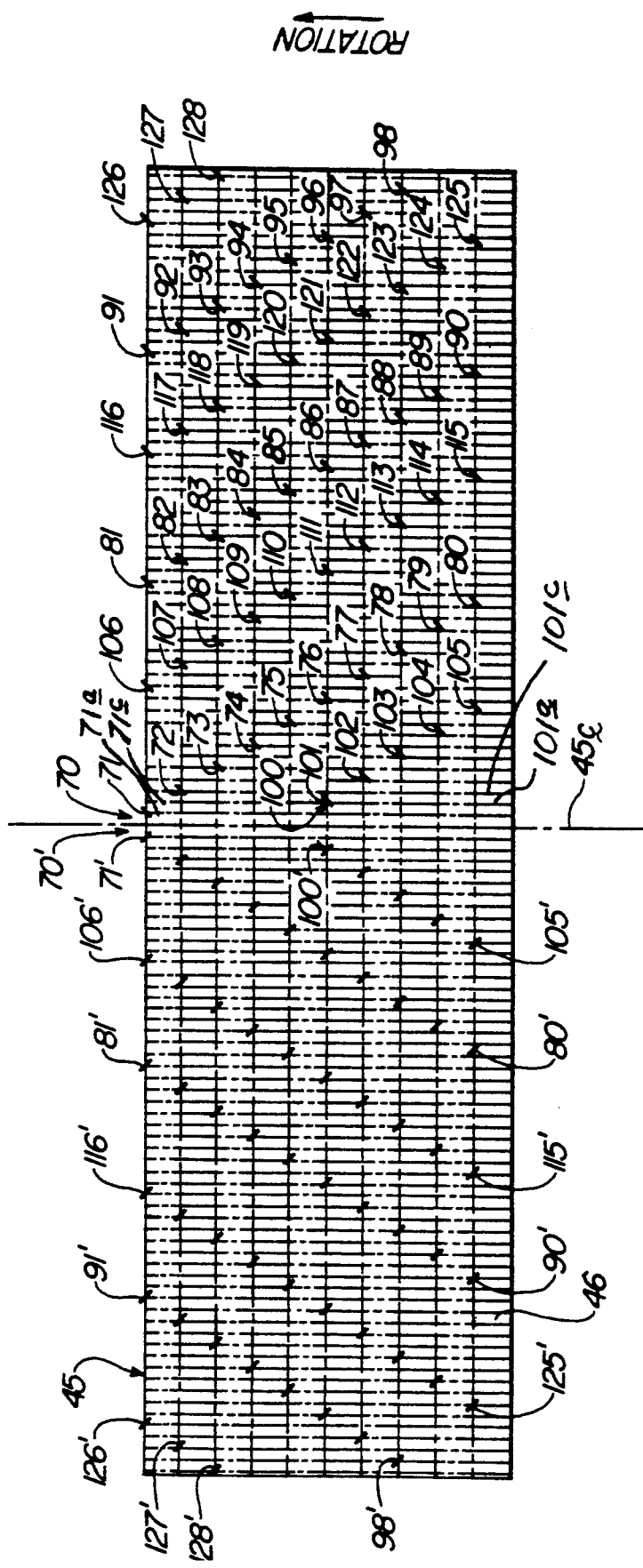
FIG. 4 is a diagrammatic view of a rotor drum surface.

FIG. 4 is a developed diagrammatic view of the surface 46 of the rotor drum 45. It should be noted that in this diagrammatic representation, the cylindrical surface 46 of the drum 45 is illustrated as a flat planar surface having a grid formed thereon to illustrate the placement and orientation of blade assemblies 47 on the drum 45. The top and bottom horizontal lines on this schematic diagram are the same line. Otherwise stated, if the wall of the cylindrical drum 45 were cut longitudinally and the cylindrical drum 45 flattened, it would appear substantially as illustrated in FIG. 4.

In the illustrated embodiment, the drum 45 is, for example, 141 inches long and 112 blade assemblies 47 are mounted on the surface 46 of the drum 45, 56 blade assemblies 47 being mounted on the left side of the centerline 45c of the drum 45 and 56 blade assemblies 47 being mounted on the right side of the centerline 45c.

In the illustrated embodiment the rotor drum 45 has an outside diameter of approximately 12¾ inches and the circumference of the drum 45 is divided into ten equal spaces extending approximately four inches around the circumference of the drum 45. Centers of the blade assemblies 47 are located along the circumferential spacings and spaced apart a distance of 2½ inches measured longitudinally along the drum 45.

Each blade assembly 47 consists of a blade 60 and blade holder 50. Each blade 60 is, for example, two inches wide and cuts a swath approximately 1½ inches wide measured longitudinally along the drum 45. The blade assemblies 47 are arranged in two helical spiral arrays 70 and 100 on one end of the drum 45, starting from the midpoint of the drum 45 and in two oppositely spiraled arrays 70' and 100' on the opposite end of drum 45. Blades 60 in the second array 100 are offset 1¼ inch, measured longitudinally along the drum 45, from the blades 60 of the first array 70.

The first blade 71 in the first array 70 (to the right side of centerline 45c of the drum 45) cuts a swath 71a which is for example, 1½ inches wide the left edge 71b of the swath 71a, as viewed in FIG. 4, lying on the centerline 45c of the drum 45. As best illustrated in FIG. 4, the center of the first blade 101 in the second array 100 of blades 60 is offset 1¼ inch, measured longitudinally along the drum 45, from the center line of the first blade 71 of the first array 70, such that the swath 101a cut by the first blade 101 of the second array 100 slightly overlaps the swath 71a cut by the first blade 71 of the first array 70. It should be appreciated that these dimensions are given for illustrative purposes only and are in no way intended to limit the scope of the appended claims.

Blades 71 and 71' having inner edges closely spaced lift material from a central portion of the pile and deposit the material behind the drum to form a vertically extending void in the swaths 71a and 71'a of blades 71 and 71'.

As viewed in FIG. 4 of the drawing, the right hand side 71c of the swath 71a cut by the first blade 71 of the first array 70 falls substantially on the center line of the first blade 101 of the second array 100 while the right hand edge 101c of the swath 101a cut by the first blade 101 of the second array 100 is substantially in alignment with the center of the second blade 72 in the first array 70. Thus, it should be appreciated that blades 60 in the first array 70 and the second array 100 are positioned relative to each other such that the swaths of blades 60 of the first array 70 and blades 60 of the second array 100 slightly overlap, the swaths 101a of the first blade 101 of the second array 100 overlapping swaths 71a and 72a cut by the first and second blades 71 and 72 of the first array 70 of blades 60.

Referring to FIG. 5, it should be noted that the lead angle L between the centerline "S" of the helical array forming the first and second arrays, 70 and 100, is approximately 60 degrees relative to the axis 45a of drum 45 such that blades 60 in each flight of blades encircle drum 45 in a distance of approximately 1/6 of the total length of the drum 45. It will be noted that as the rotor drum 45 rotates at least 12 or more blades 60 are almost always in contact with the flat planar undersurface 11 on which the compost pile 21 is distributed. Thus, blades 60 on drum 45 do not dig into the undersurface 11 but rather make a clean sweep.

Figure 2:
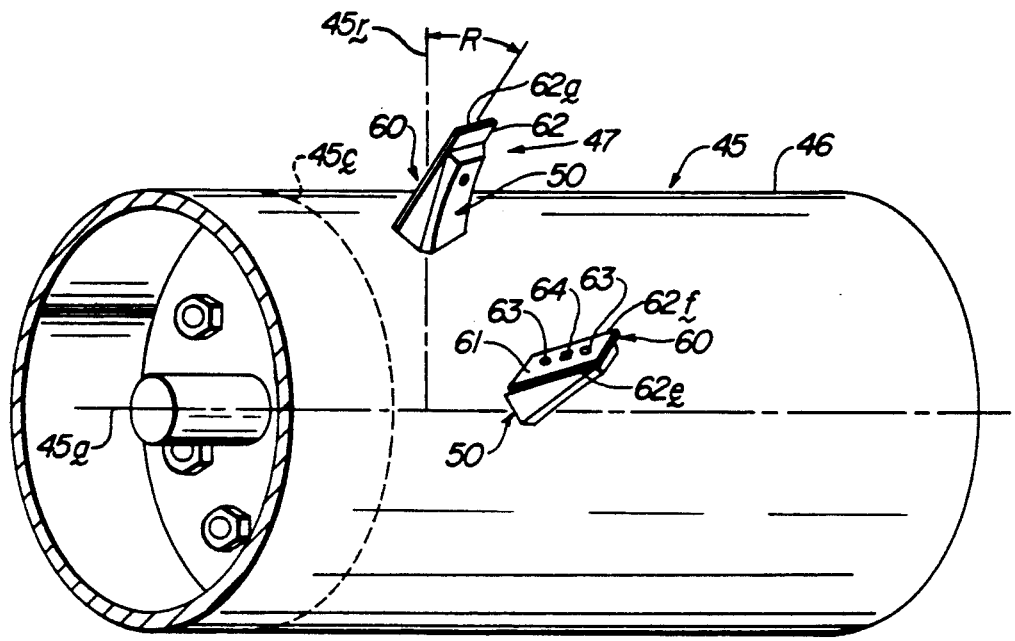
FIG. 2 is a fragmentary perspective view of a portion of the drum illustrating placement of blades and blade holders.

As illustrated in FIGS. 2 and 5, the front face 61 of each blade 60 is inclined at an angle "C" of, for example, approximately 45° relative to the centerline 45c of the drum 45 and at an angle "A" of, for example, approximately 45° relative to the longitudinal axis 45a of the drum 45. The substantially planar face 61 of each blade 60 is also inclined at an angle "R" relative to a line 45r extending radially from the surface 46 of the cylindrical drum 45 as best illustrated in FIG. 2 and is pitched at an angle "B" of, for example, approximately 60 degrees relative to the centerline "S" of the flight. Thus, material contacting the rotating blade 60 is urged toward the centerline 45c of the drum 45 and is urged away from the surface 46 of the drum 45 which provides a turbulent rolling action which thoroughly agitates the material 22 in pile 21.

In the illustrated embodiment, angle "A" and angle "C" are illustrated as being approximately 45 degrees.

However, it should be appreciated that other oblique angles may be employed.

Figure 3:
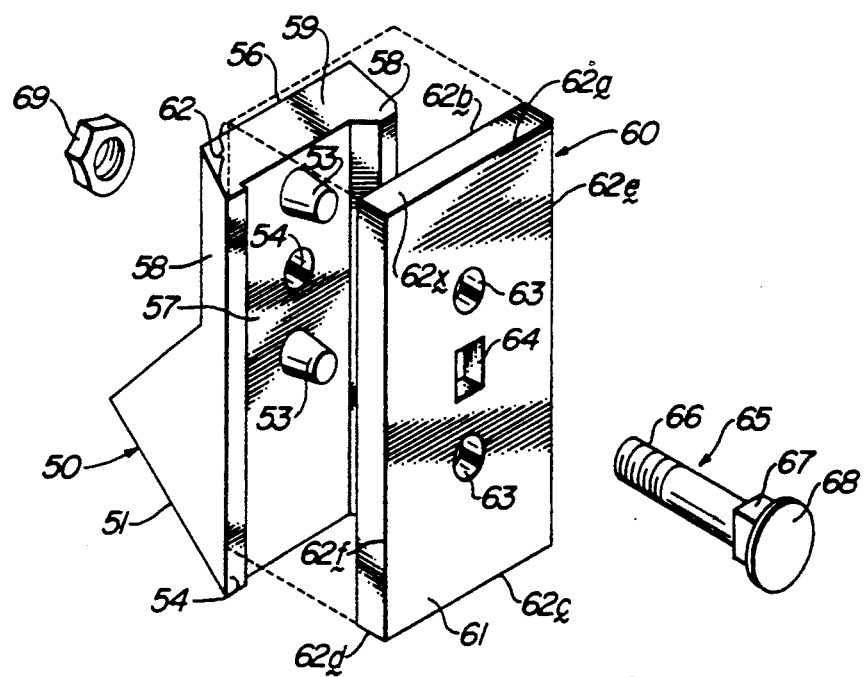
FIG. 3 is an exploded perspective view of a blade holder, blade and mounting bolt.

A typical blade assembly 47 comprising a blade holder 50 and a blade 60 is best illustrated in FIG. 3. However, blade holders 50 and blades 60 of other configurations and methods of attachment may be employed.

Each holder 50 comprises a channel section 56, a base 51, two alignment pins 53, and an aperture 54. The channel 56 is formed with a web portion 57 and two flange portions 58 that provide the bearing surfaces on which the blade 60 is mounted. The top of the blade 60 extends beyond the top of the channel 59 such that the protruding portion 62 of the blade 60 provides a cutting edge 62a or 62b or 62c or 62d.

The aperture 54 is centrally located along the vertical axis of the holder 50 and the alignment pins 53 are located on either side of the aperture 54 along the vertical axis of the holder 50.

The base 51, which is integral to the lower half of the channel section 56, is formed by the web 57 that increases in its cross-section at an increasing rate starting from the midpoint of the holder 60 down to the bottom where it mounts to the surface 46 of the drum 45. The base 51 provides stiffness to the holder 50 and mounts to the surface 46 of the drum 45 by welding or other suitable means.

Each blade 60 preferably comprises a rectangular shaped metal plate with two alignment holes 63 on either side of an aperture 64 centrally located along the vertical axis of the blade 60. The blade 60 is mounted to the blade holder 50 by a square necked carriage bolt 65. The blade aperture 64 is square and substantially the same size as the square neck 67 of the bolt 65. The threaded shank 66 of the bolt 65 passes through the blade aperture 64 and the blade holder 50 aperture 54 and is secured by a nut 69. When the blade 60 is bolted to the holder 50 the alignment pins 53 in the holder form a snug fit with the alignment holes 63 in the blade 60.

The cutting surface on the blade 60 is formed by the edge 62a along the portion 62 of the blade 60 that extends above the blade holder 50. Once edge 62a is worn, the mounting bolt 65 is removed and the blade 60 may be rotated 180° in the horizontal plane, placing edge 62c in position for use as the new cutting surface. After edge 62c is worn, the bolt 65 is removed and the blade 60 may be rotated 180° in the vertical plane to position edge 62f as the cutting surface. Likewise, once edge 62f is worn, bolt 65 is removed and the blade 60 may be rotated 180° in the horizontal plane placing edge 62b in position as the new cutting surface.

The composting apparatus 10 preferably travels at an optimum speed of about 50 feet per minute and drum 45 rotates about axis 45a at a speed of about 400 revolutions per minute. Thus the apparatus 10 advances about 1½ inch for each full revolution of drum 45.

Since blades 71 and 71' of each first array 70 and 70' are spaced approximately 180 degrees around drum 45 from blades 101 and 101' of the second arrays 100 and 100', the apparatus 10 advances along underlying surface 11 about ¾ inch from the time blades 71 and 71' pass a point before blades 101 and 101' arrive at the point.

Blades 71 and 71' form a generally vertically extending void by lifting material over the drum 45 and depositing it on the ground behind the drum 45. Blades 72 and 72' move material longitudinally of drum 45 into the void formed by blades 71 and 71'. The outermost blades 98, 98', 128 and 128' similarly move material toward the center 45c of the drum where blades 71 and 71' move material over the drum to form a neat triangular shaped windrow.

What is claimed is:

1. A method of aerating compost comprising the steps of: moving a first blade upwardly along a first path through a central portion of a pile of compost to form a first swath; moving a second blade upwardly along a second path overlapping a portion of the first path to form a second swath while moving material transversely of the first and second paths such that material moved by the second blade to form the second swath is deposited in the first swath to aerate material in the compose pile.

2. A method of aerating compost according to claim 1, with the addition of the step of: moving a third blade upwardly along a third path overlapping a portion of the second path to form a third swath while moving material transversely of the second and third paths such that material moved by the third blade to form the third swath is deposited in the second swath to aerate material in the pile.

3. A method of aerating compost according to claim 2, wherein said first, second and third blades are arranged in a first array, and with the addition of the steps of: moving first and second blades in a second array upwardly such that the first blade of the second array moves along a path overlapping adjacent portions of said first and second paths through material which has been moved into said first and second paths by said second and third blades of said first array such that said first blade of said second array forms a swath into which compost material is moved by said second blade in said second array.

4. A method of aerating compost according to claim 1, the steps of moving first and second blades comprising the steps of: rotating a cylindrical drum having blades arranged in a spiral array, the first and second blades having inner and outer edges projecting from the surface of the drum, the inner edge of the second blade being circumferentially spaced relative to the outer edge of the first blade, each of said first and second blades having a face extending between inner and outer edges, each of said faces being positioned at an oblique angle relative to the direction of rotation of the drum, relative to the axis of the cylindrical drum, and relative to the lead angle of the spiral array.

5. A method of aerating compost comprising the steps of: moving a first blade vertically along a first path through a central portion of a pile of compost to form a first swath; moving a second blade vertically along a second path adjacent the first path to form a second swath while moving material transversely of the first and second paths such that material moved by the second blade to form the second swath is deposited in the vertically extending void in the first swath; moving a third blade vertically along a third path adjacent the second path to form a third swath while moving material transversely of the second and third paths such that material moved by the third blade to form the third swath is deposited in the vertically extending void in the second swath to aerate material in the pile, wherein said first, second and third blades are arranged in a first array; and moving first and second blades in a second array vertically such that the first blade of the second array moves along a path overlapping adjacent portions of said first and second paths through material which has been moved into said first and second paths by said second and third blades of said first array such that said first blade of said second array forms a generally vertically extending swath into which compost material is moved by said second blade in said second array, the steps of moving first and second blades of each array comprising the steps of: rotating a cylindrical drum having blades arranged in spiral arrays, the first and second blades of each array having inner and outer edges projecting from the surface of the drum, the inner edge of the second blade of each array being substantially circumferentially aligned with the outer edge of the first blade of each array, each of said first and second blades having a face extending between inner and outer edges, each of said faces being positioned at an oblique angle relative to the direction of rotation of the cylindrical drum and relative to the axis of the cylindrical drum.

6. A method of aerating compost according to claim 5, said faces on said first and second blades of each array being positioned at an oblique angle relative to the lead angle of the spiral array of blades.

7. A method of aerating compost according to claim 6, said first and second arrays of blades being on a first end of the drum and with the addition of first and second arrays of blades on a second end of the drum, said first and second array of blades on the first end of the drum extending in the opposite direction to the direction of the first and second array of blades on the second end of the drum such that rotation of the drum moves each blade in each array on opposite ends of the drum such that material in the compost pile is progressively moved into an adjacent swath toward the center of the drum for mixing compost material adjacent outer edges of the pile with compost material in the center of the pile.

8. Composting apparatus comprising: a cylindrical drum; a plurality of blade holders on said drum, said blade holders being arranged in a first array along a first helical path around the circumference of one end of said drum and in a second array along a second helical path around the circumference of said one end of said drum, said blade holders in said second array being spaced substantially midway between blade holders of said first array, measured longitudinally of said drum; and blades carried by said blade holders, said blades having a width which causes central portions of a pair of swaths traced by a pair of blades in the first array to be retraced by the swath of a blade of the second array.

9. Composting apparatus according to claim 8, each of said blades comprising: a metal plate with two or more apertures centrally located in the blade.

10. Composting apparatus according to claim 8, with the addition of means detachably securing said blades to said blade holder.

11. Composting apparatus according to claim 10, said means detachably securing said blade to said blade holder comprising: a threaded bolt extending through aligned apertures in said blade and said blade holder.

12. Composting apparatus according to claim 8, wherein said blades in said first array are axially spaced so that the swath cut by adjacent blades are substantially bordering.

13. Composting apparatus according to claim 8 wherein the face of the blade is angled with respect to the longitudinal axis of the drum.

14. Composting apparatus according to claim 8, wherein the angle is approximately 45°.

15. Composting apparatus according to claim 8, wherein the angle is opposite to spiral angle.

16. Composting apparatus comprising: a cylindrical drum; a plurality of blades having throwing faces bounded by first and second edges; blade holder means securing said blades to said cylindrical drum such that first, second and third blades are spaced circumferentially around said drum and longitudinally of said drum, a first edge of said second blade being substantially circumferentially aligned with a second edge of said first blade, a second edge of said second blade being substantially circumferentially aligned with a first edge of said third blade; and means to mount said cylindrical drum for rotation such that said first, second and third blades move along first, second and third paths to form voids in a compost pile, said third blade moving material transversely relative to said third path into a void formed by movement of said second blade, and said second blade moving material transversely relative to said second path into a void formed by movement of said first blade.

17. Composting apparatus according to claim 16, said blade holder means securing said first, second and third blades to said cylindrical drum being arranged in a first array along a first helical path around the circumference of said cylindrical drum; and with the addition of blade holder means arranged in a second array along a second helical path around the circumference of said cylindrical drum, said blade holder means in said second array being spaced between said blade holders of said first array.

18. A method of aerating compost comprising the steps of: moving a first blade vertically along a first path through a centered portion of a pile of compost to form a first swath; moving a second blade vertically along a second path adjacent the first path to form a second swath while moving material transversely of the first and second paths such that material moved by the second blade to form the second swath is deposited in the vertically extending void in the first swath; moving a third blade vertically along a third path adjacent the second path to form a third swath while moving material transversely of the second and third paths such that material moved by the third blade to form the third swath is deposited in the vertically extending void in the second swath to aerate material in the pile, wherein each of said first, second and third blades has a face projecting from a cylindrical drum, each face being bounded by inner and outer edges, said blades being arranged in a spiral array on a cylindrical drum such that the inner edge of the second blade is circumferentially aligned with the outer edge of the first blade and the inner edge of the third blade is circumferentially aligned with the outer edge of the second blade such that rotation of the cylindrical drum simultaneously moves said first, second and third blades along said first, second and third path.

19. A method of aerating compost according to claim 18, the steps of moving the first, second and third blades further comprising: supporting the cylindrical drum on a vehicle having a plurality of drive wheels; rotating the drive wheels in a first direction for moving the cylindrical drum through the compost pile; and rotating the cylindrical drum in a direction opposite to the direction of rotation of the drive wheels such that said first, second and third blades are moved upwardly through the compost pile such that material in the compost pile is moved upwardly and laterally from one swath into an adjacent swath such that material adjacent the bottom of the compost pile is mixed with material adjacent the top of the compost pile.

20. A method of aerating compost comprising the steps of: rotating a cylindrical drum having blades arranged in a spiral array, the first and second blades having inner and outer edges projecting from the surface of the drum, the inner edge of the second blade being substantially circumferentially aligned with the outer edge of the first blade, each of said first and second blades having a face extending between inner and outer edges, each of said faces being positioned at an oblique angle relative to the direction of rotation of the drum and relative to the axis of the cylindrical drum for moving the first blade vertically along a first path through a centered portion of a pile of compost to form a first swath; and for moving the second blade vertically along a second path adjacent the first path to form a second swath while moving material transversely of the first and second paths such that material moved by the second blade to form the second swath is deposited in the vertically extending void in the first swath to aerate material in the compost pile.

* * * * *